United States Patent [19]
Bartels

[11] Patent Number: 4,649,603
[45] Date of Patent: Mar. 17, 1987

[54] APPARATUS FOR SEVERING THE FLAPS OF FISH

[75] Inventor: Alfred Bartels, Lübeck-Israelsdorf, Fed. Rep. of Germany

[73] Assignee: Nordischer Maschinenbau Rud. Baader GmbH & Co. Kg, Fed. Rep. of Germany

[21] Appl. No.: 733,042

[22] Filed: May 13, 1985

[30] Foreign Application Priority Data

May 10, 1984 [DE] Fed. Rep. of Germany ... 8414262[U]

[51] Int. Cl.⁴ ............................................. A22C 25/00
[52] U.S. Cl. ............................................. 17/54; 17/61
[58] Field of Search .................. 17/52, 54, 56, 57, 58, 17/60, 61, 63

[56] References Cited

U.S. PATENT DOCUMENTS 4,037,294 7/1977 Cowie et al. .............................. 17/56
4,365,387 12/1982 Hartmann et al. .................. 17/56 X
4,389,750 6/1983 Kristinsson et al. ................. 17/60 X

FOREIGN PATENT DOCUMENTS 642787 9/1950 United Kingdom ..................... 17/61
2089642 6/1982 United Kingdom ..................... 17/56
0596203 3/1978 U.S.S.R. ................................ 17/58

Primary Examiner—Willie G. Abercrombie
Attorney, Agent, or Firm—Thomas R. Morrison

[57] ABSTRACT

The invention concerns a device in processing machines for severing the belly flaps of fish. A mechanical arrangement is suggested which includes a detecting device activated by the fish to be processed, which device is associated with a locking device holding the cutting tool locked in a raised position and being released when the fish is passing.

4 Claims, 3 Drawing Figures

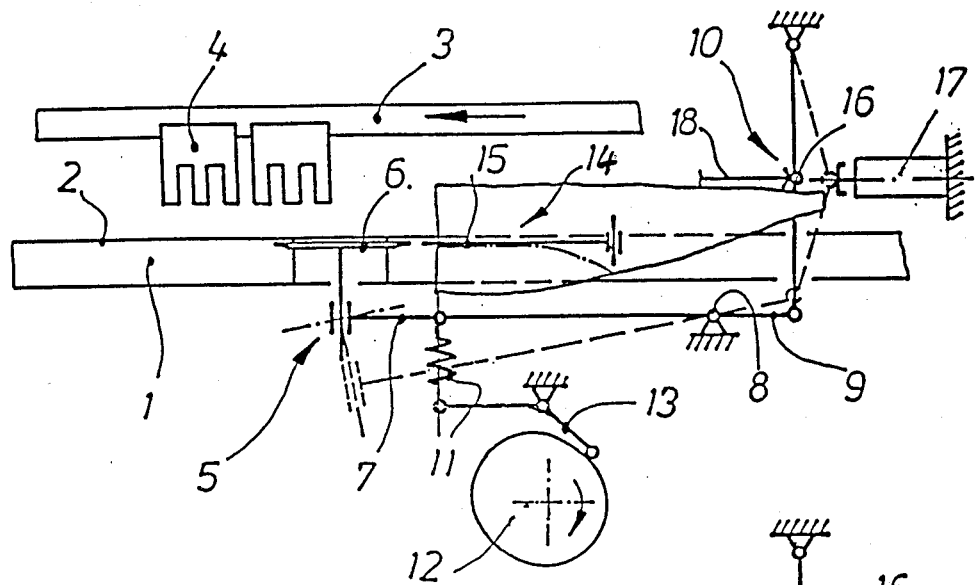
Fig. 1
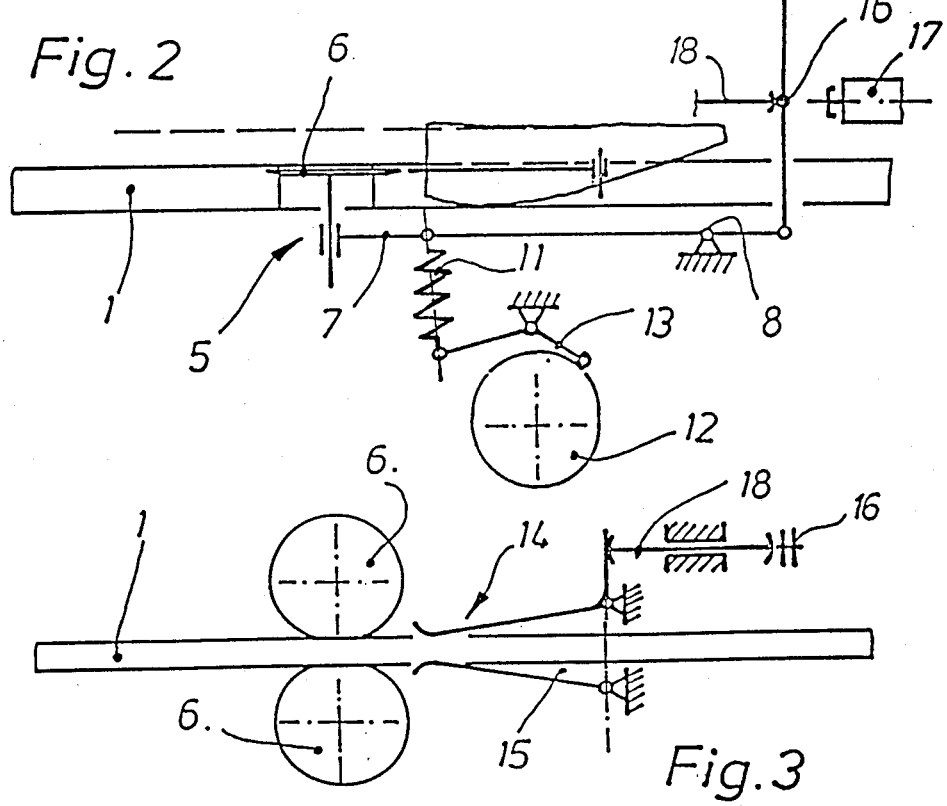
Fig. 2
Fig. 3

APPARATUS FOR SEVERING THE FLAPS OF FISH

BACKGROUND OF THE INVENTION

1. Field of the Invention

The invention relates to an arrangement for severing the belly flaps of decapitated fish opened at their bellies in fish processing machines, which belly flaps encompass the belly cavity and include the pinbones (epipleuralia) and/or the ribs, the arrangement comprising a conveyor conveying the fish by engaging their backs with the plane of decapitation leading, a guide defining a path of the fish and supporting them in their belly cavity by means of at least one supporting edge, a severing device including at least one knife, preferably a pair of driven circular knives extending into the path of the fish, and being arranged to vary its position in respect of the supporting edge, and detecting means to be actuated by the fish to be processed.

2. Description of Prior Art

German Patent Publication No. 26 12 074 discloses a device for severing the belly flaps and/or pinbones of block fillets. In this device a circular disc embraced by a rope-like conveyor is used. The block fillet is supplied to the ascending wedge of the conveyor onto the disc and is conveyed by clamping along the back-comb-line of the fish. In this manner the block fillet is supplied to a cutting device which has been adjusted to a cutting position before the arrival of the fillet by detecting the duration of its passage in a detecting device which cutting position is proportional to the block fillet's length detected in this manner. A displacement of the cutting device out of the path of the block fillet then occurs by means of a further detecting device independent of the respective size of the block fillet, the severing of the belly flaps thus being effected.

3. Objects of the Invention

It is the main purpose of the present invention to suggest an arrangement by which the expenditure in controlling steps and elements is reduced and which can be applied more universally.

SUMMARY OF THE INVENTION

In an arrangement comprising a conveyor conveying the fish by engaging their backs with the plane of decapitation leading, a guide defining a path of the fish and supporting them in their belly cavity by means of at least one supporting edge, a severing device including at least one knife, preferably a pair of driven circular knives extending into the path of the fish, and being arranged to vary its position in respect of the supporting edge, and detecting means to be actuated by the fish to be processed this purpose is achieved according to the present invention in that the severing device is mounted on an oscillating crank held against spring force, this crank comprising a locking device locking it in a raised position, and that the detecting means are associated to the locking device for unlocking it.

Preferably, the locking device can be designed as a toggle lever mechanism and the unlocking engagement by the detecting means can occur in the region of the toggle joint of the toggle lever mechanism.

In a device conveying the fish in cycles defining approximately equal distances with respect to their rump ends a controlling cam driven to rotate according to the cycles of the fish can be provided advantageously, which cam guides a controlling lever which is arranged as holding-up means for a spring, exerting the spring force on the oscillating crank.

BRIEF DESCRIPTION OF THE DRAWINGS

Other and further objects of the present invention will be apparent from the following description and claims and are illustrated in the accompanying drawings, which by way of illustration schematically show preferred embodiments of the present invention and the principles thereof and what now are considered to be the best modes contemplated for applying these principles. Other embodiments of the invention embodying the same or equivalent principles may be used and structural changes may be made as desired by those skilled in the art without departing from the present invention and the scope of the appended claims. In the drawings FIG. 1 shows a side view of the arrangement at the time of signal transmittance by a large fish, FIG. 2 shows a side view corresponding to FIG. 1 with a small fish coming to be processed and FIG. 3 shows a plan view of the arrangement.

A severing arrangement according to the present invention is located for example in a frame not represented in detail of a filletting machine preferably between the belly opening and the filletting tools thereof. A guide 1 having a supporting edge 2 forms a guiding path for the fish, the supporting edge not only supporting the fish body in its belly cavity but also defining a guiding plane for the fish body. Above the guide 1 there is a conveyor 3 driven to rotate in the direction of the arrow shown in FIG. 1. Preferably, the conveyor 3 is equipped with prismatic entrainers 4 frictionally engaging the back of the fish. On each side of the guide 1 there is arranged circular knife 6. These knives 6 are driven in an appropriate manner to form a severing device 5, extend into corresponding cut-outs in the guide 1 and are mounted on one end of an oscillating crank 7. This crank 7 is mounted in a pivoting manner about an axis 8 located below the guide 1 and designed as two-armed lever. A locking mechanism effective as locking device 10 engages the free end 9 of the oscillating crank 7, which locking mechanism operates in accordance with the toggle lever principle, includes a toggle joint 16 and effects a locking of the oscillating crank 7 in a raised position thereof. Furthermore, a spring 11 designed as a tension spring and thus effective against the raised position of the severing device 5 engages the lever of the oscillating crank 7 carrying the severing device 5. The other end of spring 11 is attached to a controlling lever 13 supported against the controlling cam 12. Upstream of the severing device 5 when seen in the conveying direction of the fish there is a feeling or detecting device 14 which comprises flaps 15. These flaps 15 are preferably synchronized centre-symmetrically and engage the flanks of the fish. When displaced by the fish to be processed from their closed rest position, the flaps 15 effect an unlocking of the locking device 10 via a shifting rod 18 by engaging the toggle joint 16. On the side of the toggle joint 16 opposing the place of engagement of the rod 18 there is a setting or operating member 17 which is effectively associated with a not-shown electric switch element. This element is made active, e.g. at a predetermined position of the controlling cam 12 or the flaps 15 to switch the setting member 17.

The function of the device as follows:

A fish rump reaching the filletting portion of the machine after the cutting off of the tail in e.g. an associated decapitating device designed in a manner appropriate for also cutting off the tail is supplied to the conveyor 3 in an appropriate manner and conveyed by this into the severing device 5. It meets the detecting device 14 whose flaps 15 are displaced from their closed position against spring force upon arrival of the head-end of the fish, this head end being defined by the plane of the decapitation. By this displacement the shifting rod 18 is operated to unlock the locking device 10 by exerting pressure on the toggle joint 16 and move this into the unlocking position shown in broken lines in FIG. 1. Prior to unlocking the circular knives 6 with their cutting planes are in the region of the supporting edge 2 of the guide 1. During the entry and supplying of the fish the controlling cam 12 has turned and affected, at the time of the unlocking action initiated by the detecting device 14 in accordance with the size of the fish to be treated that the controlling lever 13 has moved away from the oscillating crank less in the case of a large fish and more in the case of a smaller fish and thereby has biased the spring 11 accordingly, i.e. differently. Upon release of the locking device 10 the severing device 5 is pulled downwardly with lower acceleration in the case of a larger fish due to less pretension of the spring 11 whereas the acceleration of the downward movement is greater due to higher pretension of the spring when a smaller fish has been detected (cf. spring positions in FIGS. 1 and 2). Consequently the cutting length of the knives 6 in the fish continuously conveyed is varied substantially in proportion to its length. After the passage of the fish the locking device 10 is shifted back into the locking position by the action of the setting member 17 initiated by a controlling or switching pulse from the not-shown electric switch element, so that the severing device 5 is then ready for the processing of the next fish.

What is claimed is:

1. Apparatus for severing the belly flaps of fish comprising:
   at least one severing knife;
   conveying means for conveying beheaded fish past said at least one severing knife with rumps thereof trailing and in cycles defining substantially equal distances with respect to said rumps;
   a pivoted crank for supporting said at least one severing knife at a position with respect to said conveying means;
   non-resilient means for locking said pivoted crank in a predetermined position whereby said at least one severing knife is locked in a predetermined position;
   means for applying a resilient force to said pivoted crank varying in relation to a position of said rumps of said fish; and
   means for unlocking said pivoted crank in response to a head end of said fish reaching a predetermined position with respect to said at least one severing knife whereby said resilient force at the time of unlocking is variable in dependence on a length of said fish.

2. An apparatus as claimed in claim 1, wherein said means for locking includes a toggle lever mechanism including a toggle joint, said means for unlocking engaging said toggle joint and performing unlocking thereof.

3. An apparatus as claimed in claim 1, wherein said means for applying a resilient force includes a controlling lever guided by a controlling cam, a spring resiliently connecting said controlling lever to said pivoted crank, said controlling cam being rotated according to cycles of said rumps of said fish.

4. An apparatus as claimed in claim 1, wherein said severing means includes a pair of knives extending into said fish path at opposite sides thereof.

* * * * *